(12) United States Patent
Eriksson et al.

(10) Patent No.: US 12,377,844 B2
(45) Date of Patent: Aug. 5, 2025

(54) METHOD AND SYSTEM FOR KEEPING A VEHICLE ON A PREDETERMINED PATH, AND COMPUTER PROGRAM

(71) Applicant: Volvo Car Corporation, Gothenburg (SE)

(72) Inventors: Alexander Eriksson, Gothenburg (SE); Klara Essman, Gothenburg (SE); Fredrika Zeidler, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 170 days.

(21) Appl. No.: 18/167,934

(22) Filed: Feb. 13, 2023

(65) Prior Publication Data

US 2023/0271609 A1    Aug. 31, 2023

(30) Foreign Application Priority Data

Feb. 25, 2022    (EP) .................................... 22159009

(51) Int. Cl.
*B60W 30/12* (2020.01)
*B60W 40/08* (2012.01)
*B62D 15/02* (2006.01)

(52) U.S. Cl.
CPC ............ *B60W 30/12* (2013.01); *B60W 40/08* (2013.01); *B62D 15/025* (2013.01); *B60W 2540/223* (2020.02)

(58) Field of Classification Search
CPC .. B60W 30/10; B60W 30/12; B60W 2540/20; B60W 2540/223; B60W 2050/0068
See application file for complete search history.

(56) References Cited

U.S. PATENT DOCUMENTS

2014/0121897 A1* 5/2014 Felkins ................. B60W 40/08
                                                                        701/1
2014/0142798 A1   5/2014 Guarnizo Martinez et al.
(Continued)

FOREIGN PATENT DOCUMENTS

DE   102005036219 A1 *  2/2007 ............ B60W 50/16
DE   102013021139 A1 *  6/2015 ........... B62D 15/025
DE   102017208505 A1 * 11/2018

OTHER PUBLICATIONS

Extended EP Search Report for EP Application No. 22159009.4 dated Aug. 29, 2022, 5 pages.

*Primary Examiner* — Logan M Kraft
*Assistant Examiner* — Joshua Campbell
(74) *Attorney, Agent, or Firm* — Amin, Turocy & Watson, LLP

(57) ABSTRACT

The disclosure relates to a method for keeping a vehicle on a predetermined path. The method comprises receiving a driver pose information and classifying the driver pose information as normal or abnormal (S1). Alternatively or additionally, a driver attention information is received and classified as normal or abnormal (S1). Moreover, according to the method, a hand location information is received and evaluated (S2). Also a turn indicator status information is received and evaluated (S3). Subsequently, a path keeping measure is triggered (S5), if the driver pose information is classified as abnormal or if the driver attention information is classified as abnormal. Additional conditions are that the hand location information relates to less than two hands on the steering wheel, and that the turn indicator status information relates to a non-activated state of the turn indicators. Furthermore, a system for keeping a vehicle on a predetermined path is presented. Moreover, a corresponding computer program is explained.

18 Claims, 2 Drawing Sheets

(56) References Cited

U.S. PATENT DOCUMENTS

| | | |
|---|---|---|
| 2016/0068103 A1 | 3/2016 | McNew et al. |
| 2016/0090100 A1* | 3/2016 | Oyama ................ B62D 15/025 |
| | | 701/23 |
| 2017/0355367 A1* | 12/2017 | Fu ......................... B60W 30/12 |
| 2019/0147266 A1 | 5/2019 | Aizawa et al. |
| 2020/0239007 A1* | 7/2020 | Sobhany .............. G05D 1/0061 |
| 2021/0009122 A1 | 1/2021 | Nath et al. |
| 2022/0371660 A1* | 11/2022 | Yasuda ................ B62D 15/025 |

* cited by examiner

METHOD AND SYSTEM FOR KEEPING A VEHICLE ON A PREDETERMINED PATH, AND COMPUTER PROGRAM

TECHNICAL FIELD

The present disclosure relates to a method for keeping a vehicle on a predetermined path.

Moreover, the present disclosure is directed to a system for keeping a vehicle on a predetermined path.

Additionally, the present disclosure relates to a computer program.

BACKGROUND

Vehicles, especially motor vehicles such as cars or trucks, usually travel along a predetermined path. In a vehicle having a human driver, the path is determined by the human driver. In a fully or partially autonomous vehicle the path may be at least partially determined by an autonomous driving control unit, i.e. by a computer device.

The predetermined path may also be called an intended path or a desired path.

In the present context, the path may be either understood as a trajectory along which the vehicle travels or as an area between boundaries on which the vehicle travels. The path may form a sub-portion of a traffic lane or may substantially correspond to a traffic lane on with the vehicle travels.

It is obvious that for road security reasons the vehicle needs to stay on the predetermined path. This includes situations in which the vehicle turns around a corner or changes lanes. In these situations the intended path also makes a turn or describes a lane change. If the vehicle leaves the predetermined path there is a high risk that the vehicle leaves the road or collides with other vehicles.

For these reasons, it is known to equip vehicles with notification devices which notify a driver when he or she is leaving the predetermined path, e.g. by issuing a warning sound.

The objective of the present disclosure is to provide improved means for keeping a vehicle on a predetermined path.

SUMMARY

The problem is at least partially solved or alleviated by the subject matter of the independent claims of the present disclosure, wherein further examples are incorporated in the dependent claims.

According to a first aspect, there is provided a method for keeping a vehicle on a predetermined path, comprising receiving a driver pose information and classifying the driver pose information as normal or abnormal and/or receiving a driver attention information and classifying the driver attention information as normal or abnormal, receiving a hand location information, and evaluating whether the hand location information relates to two hands on a steering wheel or less than two hands on the steering wheel, receiving a turn indicator status information, and evaluating whether the turn indicator status information relates to an activated state or a non-activated state of the turn indicators, triggering a path keeping measure if the received driver pose information is classified as abnormal and/or if the received driver attention information is classified as abnormal and if the hand location information relates to less than two hands on the steering wheel, and if the received turn indicator status information relates to a non-activated state.

In this context, the driver pose information and/or the driver attention information may be provided by a driver monitoring system. Such a driver monitoring system may comprise one or more cameras configured for capturing the driver while driving. Also a radar system can be used. Thus, the driver pose information and/or the driver attention information may be provided in the form of image data showing the driver.

The classification of the driver pose information and/or the driver attention information may be performed by analyzing the image data. For example, an upper body pose of the driver may be analyzed and compared to a predefined standard pose. If the upper body pose as shown in the image data deviates from the standard pose, the driver pose information is classified as abnormal. Otherwise, the driver pose information is classified as normal.

Also the eyes of the driver may be analyzed in the image data. Thus, it may be determined how often and/or how long the eyes are closed and how often and/or how long the eyes are open. If the eyes are closed more often than a predefined threshold or longer than a predefined threshold, the driver attention information may be classified as abnormal. Otherwise, the driver attention information may be classified as normal.

The hand location information may be provided by a hands-on-detection system having a sensor in the steering wheel of the vehicle which is configured for determining whether a human hand touches the steering wheel. Such a hands-on-detection systems may also be configured for determining a number of hands that touches the steering wheel. The sensor may be e.g. a capacitive sensor.

The turn indicator status information may be provided by a turn indicator unit. The turn indicator status information may be a binary signal, wherein one of the binary states is related to an activated state of the turn indicators and the respective other binary state is related to a non-activated state of the turn indicators.

According to the method of the present disclosure, the driver pose information and/or the driver attention information, the hand location information and the turn indicator status information are considered in combination. Only in a case in which the received driver pose information is classified as abnormal and/or if the received driver attention information is classified as abnormal and at the same time the hand location information relates to less than two hands on the steering wheel and at the same time the received turn indicator status information relates to a non-activated state, the method of the present disclosure determines that there is a need to trigger a path keeping measure. In this context, a path keeping measure is any measure that helps to keep the vehicle on the predetermined path. Thus, potentially dangerous situations that can occur when the vehicle unintentionally leaves the predetermined path are avoided. For example, the triggered path keeping measure has the result that the vehicle does not cross into opposing traffic and/or unintentionally leave the lane or road.

In an illustrative example, the driver is reaching for an object on the passenger seat or on the back seat of the vehicle. This leads to the situation that the driver turns his or her upper body out of the standard pose. Moreover, the driver's view deviates from the road ahead of the vehicle. Furthermore, the driver takes one hand off the steering wheel since he or she wants to use this hand for grabbing the object. While these activities happen, the turn indicators are in a non-activated state. As a consequence thereof, a path keeping measure is triggered.

It is noted that a path keeping measure is not triggered, if the driver pose is classified as normal or if both hands are on the steering wheel.

Also evaluating whether the turn indicator status information relates to an activated state or a non-activated state of the turn indicators is an important aspect of the method. Evaluating the turn indicator status information allows to distinguish situations in which a path keeping measure is to be triggered from situations in which a path keeping measure is not helpful. The latter may be the case if the driver intends to turn into a very narrow road and significantly turns his or her upper body and head for being able to check for pedestrians of cyclists. At the same time the driver may have taken one hand off the steering wheel in order to facilitate the turning of the upper body.

The triggered path keeping measure may be provided by a steering system of the vehicle. Thus, the path keeping measure may comprise an adaptation of the steering system. This adaptation may comprise at least one of changing an operational parameter of the steering system and operating the steering system.

More specifically, the path keeping measure may comprise at least one of increasing a stiffness of a steering system, adjusting a heading angle of the vehicle, i.e. automatically steering the vehicle, and providing a counter torque on the steering wheel.

In an example, the method may comprise evaluating whether the hand location information relates to one hand on the steering wheel or no hand on the steering wheel. Thus, the situation of the driver's hands can be evaluated with high precision. Consequently, the path keeping measure may be triggered with high reliability.

In an example, the method may comprise receiving a path following information and classifying the path following information as on-path or off-path. Thus, it is possible to evaluate whether the vehicle has already left the predetermined path or still is on the predetermined path. As a consequence thereof, an appropriate path keeping measure can be triggered.

The path following information may be provided by a lane assist system.

Moreover, the path following information may comprise a time that the vehicle would need until it exits its current lane when one assumes that the heading angle is kept. This time can be compared to a predefined threshold. If the time is smaller than the threshold, the path following information is classified as off-path. Otherwise, the path following information is classified as on-path.

In an example, triggering a path keeping measure comprises triggering an increased stiffness of a steering system of the vehicle, if the path following information is classified as on-path. This path keeping measure has the consequence that a driver needs to turn the steering wheel with an increased force or torque in order to be able to leave the predetermined path. Thus, the risk that the driver unintentionally manipulates the steering wheel and leaves the path is significantly reduced.

In an example, triggering a path keeping measure comprises triggering an increased stiffness of the steering system, if the hand location information relates to one hand on the steering wheel. Also in this case the drive would need to use an increased force or torque to turn the steering wheel for being able to direct the vehicle off the predetermined path. Thus, this path keeping measure helps to keep the vehicle on the predetermined path with one hand only.

In an example, triggering a path keeping measure comprises triggering a heading angle adjustment measure, if the hand location information relates to no hand and if the path following information is classified as off-path. Consequently, by the heading angle adjustment measure, the vehicle is redirected to the predetermined path. This is done automatically, i.e. without driver interaction. Thus, also in a situation in which the driver has taken both hands off the steering wheel the vehicle may be kept on the predetermined path, i.e. in a safe driving condition.

In an example, triggering a path keeping measure comprises triggering a counter torque at the steering wheel, if the path following information is classified as off-path. In other words, the driver is assisted in steering the vehicle back on the predetermined path.

In an example, triggering a path keeping measure comprises triggering the counter torque at the steering wheel, if the hand location information relates to one hand on the steering wheel. Consequently, the driver is assisted in steering the vehicle back on the predetermined path. Due to the fact that he or she has one hand on the steering wheel he or she is able to notice that a path keeping measure occurs.

In a further example, triggering a path keeping measure may comprise issuing a notification for the driver, e.g. a warning message. Such a warning message can be of any type, e.g. acoustic, visual or haptic.

The method according to the present disclosure may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a system for keeping a vehicle on a predetermined path, comprising a first communication interface configured to receive a driver pose information and/or a driver attention information, a second communication interface configured to receive a hand location information, a third communication interface configured to receive a turn indicator status information, and a triggering unit being communicatively connected to the first communication interface, the second communication interface and the third communication interface. The triggering unit is configured to trigger a path keeping measure as a function of the information received at the first communication interface, at the second communication interface and at the third communication interface. Consequently, a path keeping measure can be triggered in a situational manner, i.e. only in situations when needed. To this end, the information received at the first communication interface, the second communication interface and the third communication interface are considered in combination. Thus, potentially dangerous situations that can occur when the vehicle unintentionally leaves the predetermined path are avoided. For example, the triggered path keeping measure has the result that the vehicle does not cross into opposing traffic and/or unintentionally leave the lane or road. More generally speaking, the driving safety is enhanced.

In an example, the system may comprise a first classification unit being communicatively interposed between the first communication interface and the triggering unit, wherein the first classification unit is configured to classify the driver pose information and/or the driver attention information. The first classification unit may comprise an image analyzing unit which is configured for analyzing image data which comprises the driver pose information and/or the driver attention information. The driver pose information may be classified as abnormal if the upper body pose as shown in the image data deviates from a standard pose. Otherwise, the driver pose information may be classified as normal.

Also the driver attention information may be comprised in the image data, e.g. in the form of images of the driver's eyes. The first classification unit may be configured for determining how often and/or how long the eyes are closed and how often and/or how long the eyes are open. If the eyes are closed more often than a predefined threshold or longer than a predefined threshold, the driver attention information may be classified as abnormal. Otherwise, the driver attention information may be classified as normal.

In an example, the system may also comprise a first evaluation unit being communicatively interposed between the second communication interface and the triggering unit, wherein the first evaluation unit is configured to evaluate whether the hand location information relates to two hands on a steering wheel or less than two hands on the steering wheel. Consequently, the path keeping measure may be triggered as a function of the number of hands grabbing the steering wheel.

In an example, the system may comprise a second evaluation unit being communicatively interposed between the third communication interface and the triggering unit, wherein the second evaluation unit is configured to evaluate whether the turn indicator status information relates to an activated state or a non-activated state of the turn indicators. In other words, the second evaluation unit is configured for determining if the turn indicators are on or off. In situation in which the turn indicators are on, it is very likely that the intended path of the driver abruptly changes or deviates from the originally intended path. In such situations a path keeping measure may not be appropriate and, thus, should be avoided.

In an example, the system may comprise a fourth communication interface configured to receive a path following information, wherein the triggering unit is communicatively connected to the fourth communication interface and configured for triggering the path keeping measure as a function of the information received at the fourth communication interface. Thus, the path keeping measure can be triggered depending on the path following information. Consequently, a situationally appropriate path keeping measure may be triggered.

Again, the path following information may be provided in the form of a time until a current lane is left, as has been explained above.

In an example, the system may comprise a second classification unit being communicatively interposed between the fourth communication interface and the triggering unit, wherein the second classification unit is configured to classify the path following information as on-path or off-path. Consequently, it is possible to trigger different path keeping measure depending on the fact whether the vehicle is on-path or off-path.

According to a third aspect, there is provided a computer program comprising instructions which, when the program is executed by a computing unit, cause the computing unit to carry out the method of the present disclosure. A computing unit may also be simply called a computer.

This computer program may be provided on a computer readable storage medium.

It should be noted that the above examples may be combined with each other irrespective of the aspect involved. Accordingly, the method may be combined with structural features and, likewise, the system may be combined with features described above with regard to the method.

These and other aspects of the present disclosure will become apparent from and elucidated with reference to the examples described hereinafter.

BRIEF DESCRIPTION OF THE FIGURES

Examples of the disclosure will be described in the following with reference to the following drawings.

DETAILED DESCRIPTION OF THE FIGURES

The figures are merely schematic representations and serve only to illustrate examples of the disclosure. Identical or equivalent elements are in principle provided with the same reference signs.

Figure 1:
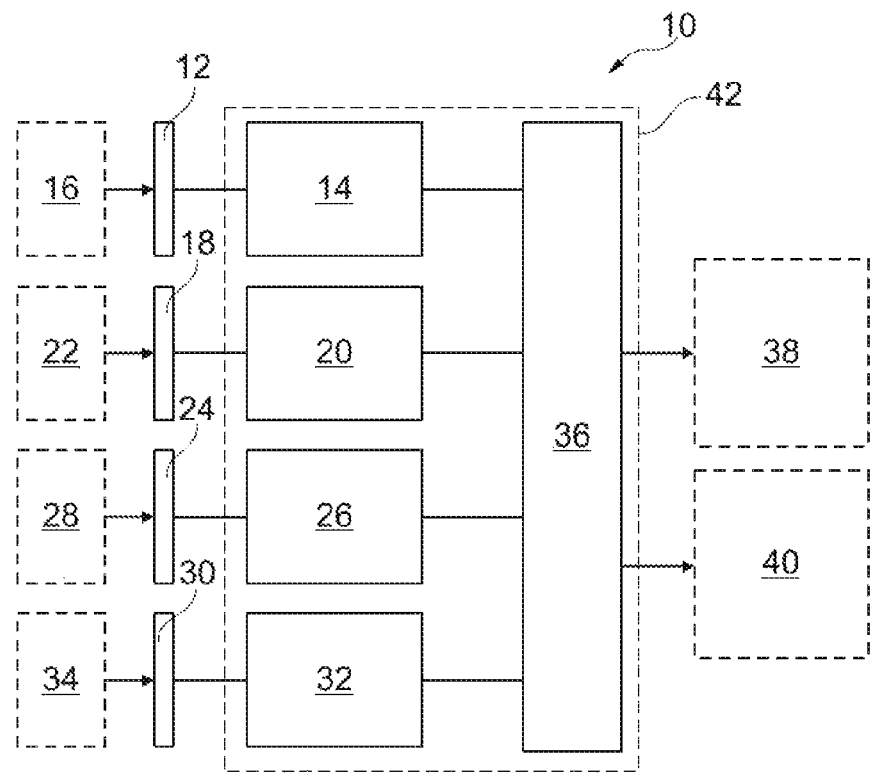
FIG. 1 shows a system according to the present disclosure for keeping a vehicle on a predetermined path.

FIG. 1 shows a system 10 for keeping a vehicle on a predetermined path.

The system 10 comprises a first communication interface 12 for receiving a driver pose information, i.e. an information describing a driver pose. In the present example the driver pose is to be understood as an upper body pose of the driver.

Moreover, the first communication interface 12 is configured for receiving a driver attention information, i.e. an information describing a state of attentiveness of the driver.

Additionally, the system 10 comprises a first classification unit 14 which is communicatively connected to the first communication interface 12.

The first classification unit 14 is configured to classify the driver pose information and the driver attention information. In the present example, the first classification unit 14 is configured for classifying the driver pose information as normal or abnormal. The same applies to the driver attention information, i.e. the first classification unit 14 is configured for classifying the driver attention information as normal or abnormal.

When in use, the system 10, more precisely the first communication interface 12, may be communicatively connected to a driver monitoring system 16.

Additionally, the system 10 has a second communication interface 18 configured to receive a hand location information. Thus, the second communication interface 18 is configured to receive an information relating to the location of at least one of the driver's hands.

The system 10 additionally has a first evaluation unit 20 which is communicatively connected to the second communication interface 18. The first evaluation unit 20 is configured to evaluate whether the received hand location information relates to two hands on a steering wheel, one hand on the steering wheel or no hand on the steering wheel.

When in use, the system 10, more precisely the second communication interface 18 may be communicatively connected to a hands-on-detection system 22 of a corresponding vehicle.

Furthermore, the system 10 has a third communication interface 24 configured to receive a turn indicator status information. In other words, the third communication interface 24 is configured to receive an information describing a status of the turn indicators of the vehicle.

Furthermore, a second evaluation unit 26 forms part of the system 10. The second evaluation unit 26 is communicatively connected to the third communication interface 24. The second evaluation unit 26 is configured to evaluate whether the received turn indicator status information relates to an activated state or a non-activated state of the turn indicators.

To this end, the third communication interface 24 is connected to a turn indicator unit 28 when the system 10 is in use.

The system 10 also comprises a fourth communication interface 30 configured to receive a path following information. The fourth communication interface 30 is, thus, configured to receive an information describing whether the vehicle follows a predetermined path or not.

A second classification unit 32 is communicatively connected to the fourth communication interface 30. The second classification unit 32 is configured to classify the path following information as on-path or off-path.

When in use, the system 10, more precisely the fourth communication interface 30, may be communicatively connected to a lane assist system 34.

The system 10 additionally comprises a triggering unit 36.

The triggering unit 36 is communicatively connected to the first classification unit 14, the first evaluation unit 20, the second evaluation unit 26, and the second classification unit 32.

Thus, the triggering unit 36 is communicatively connected to the first communication interface 12 via the first classification unit 14, communicatively connected to the second communication interface 18 via the first evaluation unit 20, communicatively connected to the third communication interface 24 via the second evaluation unit 26 and communicatively connected to the fourth communication interface 30 via the second classification unit 32.

The triggering unit 36 is configured for triggering a path keeping measure as a function of the information received at the first communication interface 12, at the second communication interface 18, at the third communication interface 24, and at the fourth communication interface 30.

In the present example, the path keeping measure may be one of increasing a stiffness of a steering system of the respective vehicle, providing a counter torque at the steering wheel, and adjusting a heading angle of the vehicle.

In order to be able to trigger these path keeping measures, the system 10, more precisely the triggering unit 36, is communicatively connected to a steering system 38 of the vehicle.

Moreover, the triggering unit 36 is configured to trigger a warning message for the driver. To this end, the triggering unit 36 is communicatively connected to a notification unit 40.

Figure 2:
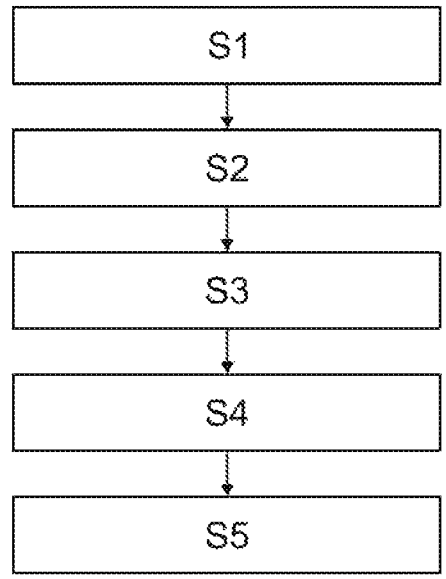
FIG. 2 illustrates steps of a method according to the present disclosure for keeping a vehicle on a predetermined path.
Figure 3:
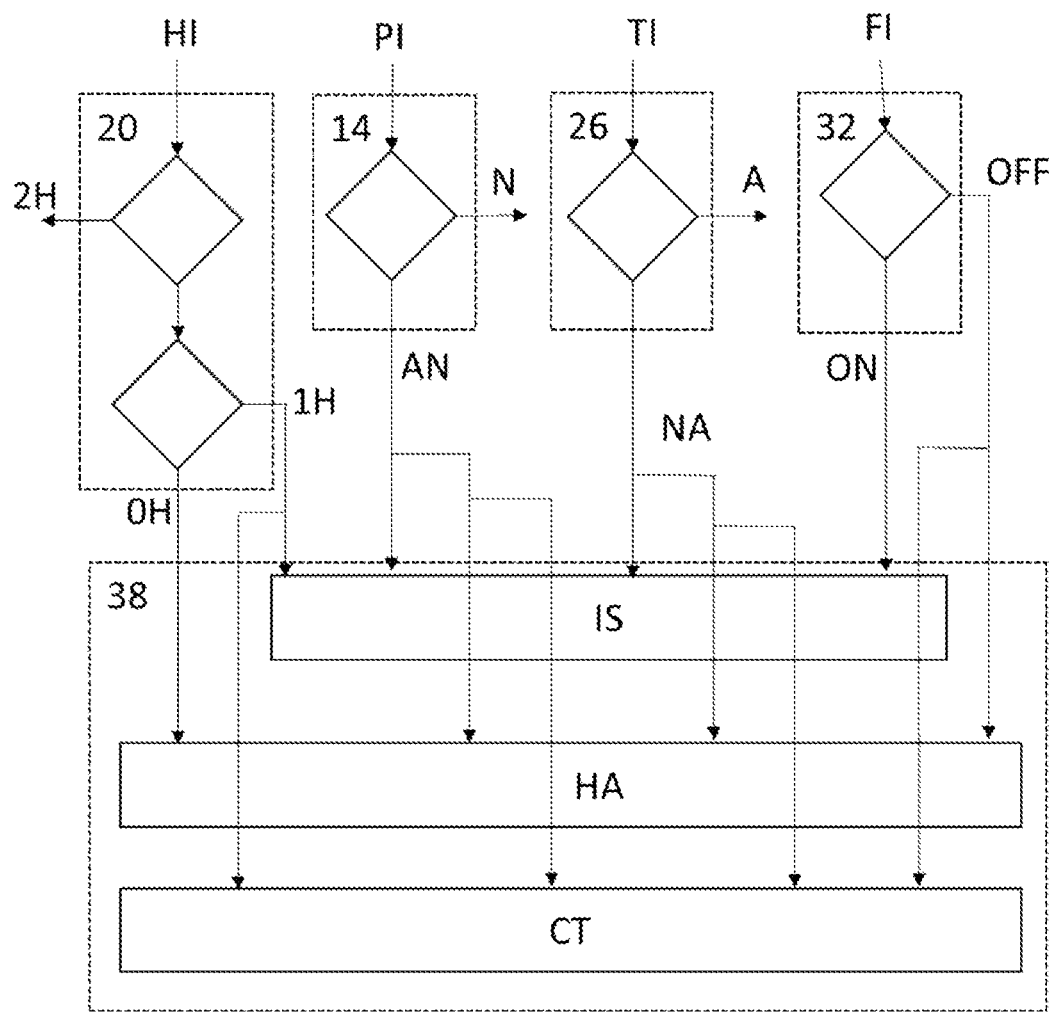
FIG. 3 illustrates the method of FIG. 2 in the form of a flow diagram.

The system 10 may be used for performing a method for keeping a vehicle on a predetermined path. This is illustrated in FIGS. 2 and 3.

The method will be explained in connection with a set of four different driving situation in which the method is used.

In each of these driving situations, the driver is reaching for an object on the back seat or on the front passenger seat of the vehicle.

In a first step S1 of a first driving situation, a driver pose information PI is received via the first communication interface 12. Using the first classification unit 14, this driver pose information is classified as abnormal AN, i.e. it is determined that the driver is outside the usual driving pose.

In a second step S2, a hand location information HI is received at the second communication interface 18. Using the first evaluation unit 20, it is evaluated that only one hand 1H is on the steering wheel.

Subsequently, in a third step S3, a turn indicator status information TI is received at the third communication interface 24. The second evaluation unit 26 evaluates that the turn indicator status information TI relates to a non-activated state NA of the turn indicators.

In a fourth step, a path following information FI is received at the fourth communication interface 30. The second classification unit 32 is classifying the path following information as off-path OFF. In the present example this is done by calculating a time that the vehicle would need until it exits the present lane. This time is compared to a predefined threshold.

Thereafter, in a fifth step S5, the triggering unit 36 is used for triggering a path keeping measure. In the present driving situation, the triggered path keeping measure is applying a counter torque CT to the steering wheel. This counter torque CT will indicate to the driver that he or she is drifting away from the predetermined path. The driver notices the counter torque CT and, thus, can go back to the standard driving pose, place both hands on the steering wheel and steer the vehicle back to the predetermined path.

It is noted that the designation of the method steps as first, second, third, fourth and fifth is for the ease of explanation only. The first, second, third and fourth step can as well be performed in any other order.

A second driving situation partially corresponds to the first driving situation. The only difference is that the path following information FI which is received at the fourth communication interface 30 is classified as on-path ON, i.e. the vehicle is on the predetermined path.

Also in this case, the triggering unit 36 triggers a path keeping measure. However, in the second driving situation, the path keeping measure is increasing a stiffness IS of the steering system 38 such that a torque applied to the steering wheel by the driver has less impact on the driving behavior of the vehicle.

Once the driver is back in the standard driving pose and has placed both hands on the steering wheel the path keeping measure can be terminated.

Also a third driving situation will be explained by only mentioning the differences over the first driving situation.

In the third driving situation, in the second step, the received hand location information is evaluated by the first evaluation unit 20 and it is found that the hand location information relates to no hand 0H on the steering wheel.

Also in the third driving situation, a path keeping measure is triggered by the triggering unit 36. However, in the third driving situation the path keeping measure is to adjust a heading angle HA of the vehicle, i.e. to automatically steer the vehicle such that it comes back to the predetermined path.

Moreover, using the notification unit 40, an alert will be produced such that the driver notices the dangerous driving situation and can take back full control of the vehicle.

An additional, fourth driving situation will be explained by only mentioning the differences over the first driving situation.

Again, in the second step, the received hand location information is evaluated by the first evaluation unit 20 and it is found that the hand location information relates to no hand 0H on the steering wheel.

Moreover, the path following information which is received at the fourth communication interface 30 is classified as on-path ON, i.e. the vehicle is not outside the predetermined path.

In the fourth driving situation, the path keeping measure may comprise alerting the driver via the notification unit 40.

It is noted that the system 10 may comprise a computing unit 42 which comprises the first classification unit 14, the first evaluation unit 20, the second evaluation unit 26, the second classification unit and the triggering unit 36. All of these units may be implemented as software and/or hardware units. On this computing unit 42, a computer program may be run which comprising instructions causing the computing unit 42 to carry out the method as explained above.

Other variations to the disclosed examples can be understood and effected by those skilled in the art in practicing the claimed disclosure, from the study of the drawings, disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS

10 system for keeping a vehicle on a predetermined path
12 first communication interface
14 first classification unit
16 driver monitoring system
18 second communication interface
first evaluation unit
22 hands-on-detection system
24 third communication interface
26 second evaluation unit
28 turn indicator unit
fourth communication interface
32 second classification unit
34 lane assist system
36 triggering unit
38 steering system
notification unit
42 computing unit
0H no hands on the steering wheel
1H one hand on the steering wheel
2H two hands on the steering wheel
A activated
AN abnormal
CT apply counter torque
FI path following information
HA heading angle adjustment measure
HI hand location information
IS increase stiffness
N normal
NA non-activated
OFF off path
ON on path
PI driver pose information
S1 first step
S2 second step
S3 third step
S4 fourth step
S5 fifth step
TI turn indicator status information

The invention claimed is:

1. A method for keeping a vehicle on a predetermined path, comprising
receiving, a system comprising a processor, at least one of a driver pose information (PI) or a driver attention information;
classifying, by the system, the at least one of the driver pose information (PI) or the driver attention information as normal (N) or abnormal (AN);
receiving, by the system, a hand location information (HI);
evaluating, by the system, whether the hand location information (HI) relates to two hands (2H) on a steering wheel or to one hand (1H) on the steering wheel or to no hands (OH) on the steering wheel;
receiving, by the system, a turn indicator status information (TI);
evaluating, by the system, whether the turn indicator status information (TI) relates to an activated state (A) or a non-activated state (NA) of the turn indicators (S3) of the vehicle;
receiving, by the system, a path following information (FI) of the vehicle;
classifying, by the system, the path following information of the vehicle as on-path (ON) or off-path (OFF); and
triggering, by the system, a path keeping measure (S5) if the at least one of driver pose information (PI) or the received driver attention information is classified as abnormal, and if the hand location information (HI) relates to less than two hands on the steering wheel, and if the received turn indicator status information (TI) relates to a non-activated state (NA), wherein triggering the path keeping measure comprises triggering a heading angle adjustment measure (HA), if the hand location information (HI) relates to no hand (OH) and if the path following information (FI) of the vehicle is classified as off-path (OFF).

2. The method of claim 1, wherein triggering the path keeping measure comprises triggering an increased stiffness (IS) of a steering system of the vehicle, if the path following information of the vehicle is classified as on-path (ON).

3. The method of claim 1, wherein triggering the path keeping measure comprises triggering an increased stiffness (IS) of a steering system of the vehicle, if the hand location information (HI) relates to one hand (1H) on the steering wheel.

4. The method of claim 1, wherein triggering a path keeping measure comprises triggering a counter torque (CT) at the steering wheel, if the path following information (FI) of the vehicle is classified as off-path (OFF).

5. The method of claim 1, wherein triggering a path keeping measure comprises triggering a counter torque (CT)

at the steering wheel, if the hand location information (HI) relates to one hand (1H) on the steering wheel.

6. A system for keeping a vehicle on a predetermined path, comprising:
a memory that stores computer program instructions; and
a processor that executes at least one of the computer program instructions that:
receives at least one of a driver pose information (PI) or a driver attention information;
receives a hand location information (HI);
evaluates whether the hand location information (HI) relates to two hands (2H) on a steering wheel or one hand (1H) on the steering wheel or no hands (OH) on the steering wheel;
receives a turn indicator status information (TI);
receives a path following information (FI) of the vehicle;
classifies the path following information of the vehicle as on-path (ON) or off-path (OFF);
triggers a path keeping measure as a function of the at least one of driver pose information (PI) or the received driver attention information, the hand location information (HI), the received turn indicator status information (TI), and the path following information (FI), wherein triggering the path keeping measure comprises triggering a heading angle adjustment measure (HA), if the hand location information (HI) relates to no hand (OH) and if the path following information (FI) of the vehicle is classified as off-path (OFF).

7. The system of claim 6, wherein the at least one of the computer program instructions further:
classifies the at least one of the driver pose information (PI) or the driver attention information as normal (N) or abnormal (AN).

8. The system of claim 6, wherein triggering the path keeping measure comprises triggering an increased stiffness (IS) of a steering system of the vehicle, if the path following information of the vehicle is classified as on-path (ON).

9. The system of claim 6, wherein the at least one of the computer program instructions further: evaluates whether the turn indicator status information (TI) relates to an activated state (A) or a non-activated state (NA) of the turn indicators.

10. The system of claim 6, wherein the function comprises determining that the at least one of driver pose information (PI) or the received driver attention information is classified as abnormal, and the hand location information (HI) relates to less than two hands on the steering wheel, and the received turn indicator status information (TI) relates to a non-activated state (NA).

11. The system of claim 6, wherein triggering the path keeping measure comprises triggering an increased stiffness (IS) of a steering system of the vehicle, if the hand location information (HI) relates to one hand (1H) on the steering wheel.

12. The system of claim 6, wherein triggering the path keeping measure comprises triggering a counter torque (CT) at the steering wheel, if the path following information (FI) of the vehicle is classified as off-path (OFF).

13. The system of claim 6, wherein triggering the path keeping measure comprises triggering a counter torque (CT) at the steering wheel, if the hand location information (HI) relates to one hand (1H) on the steering wheel.

14. A non-transitory computer readable storage medium comprising computer program instructions which, when executed by processor, cause the processor to perform operations comprising:
receiving at least one of a driver pose information (PI) or a driver attention information;
classifying the at least one of the driver pose information (PI) or the driver attention information as normal (N) or abnormal (AN);
receiving a hand location information (HI)
evaluating whether the hand location information (HI) relates to two hands (2H) on a steering wheel or to one hand (1H) on the steering wheel or to no hands (OH) on the steering wheel;
receiving a turn indicator status information (TI);
evaluating whether the turn indicator status information (TI) relates to an activated state (A) or a non-activated state (NA) of the turn indicators (S3) of the vehicle;
receiving a path following information (FI) of the vehicle;
classifying the path following information of the vehicle as on-path (ON) or off-path (OFF); and
triggering a path keeping measure (S5) if the at least one of driver pose information (PI) or the received driver attention information is classified as abnormal, and if the hand location information (HI) relates to less than two hands on the steering wheel, and if the received turn indicator status information (TI) relates to a non-activated state (NA), wherein triggering the path keeping measure comprises triggering a heading angle adjustment measure (HA), if the hand location information (HI) relates to no hand (OH) and if the path following information (FI) of the vehicle is classified as off-path (OFF).

15. The non-transitory computer readable storage medium of claim 14, wherein triggering the path keeping measure comprises triggering an increased stiffness (IS) of a steering system of the vehicle, if the path following information of the vehicle is classified as on-path (ON).

16. The non-transitory computer readable storage medium of claim 14, wherein triggering the path keeping measure comprises triggering an increased stiffness (IS) of a steering system of the vehicle, if the hand location information (HI) relates to one hand (1H) on the steering wheel.

17. The non-transitory computer readable storage medium of claim 14, wherein triggering the path keeping measure comprises triggering a counter torque (CT) at the steering wheel, if the path following information (FI) of the vehicle is classified as off-path (OFF).

18. The non-transitory computer readable storage medium of claim 14, wherein triggering the path keeping measure comprises triggering a counter torque (CT) at the steering wheel, if the hand location information (HI) relates to one hand (1H) on the steering wheel.

* * * * *